United States Patent [19]

Worley, Jr.

[11] Patent Number: 4,649,478

[45] Date of Patent: Mar. 10, 1987

[54] OPERATION CODE SELECTED OVERFLOW INTERRUPTS

[75] Inventor: William S. Worley, Jr., Saratoga, Calif.

[73] Assignee: Hewlett-Packard Company, Palo Alto, Calif.

[21] Appl. No.: 750,626

[22] Filed: Jun. 28, 1985

[51] Int. Cl.[4] .............................................. G06F 9/34
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,312,034 | 1/1982 | Gunter et al. | 364/200 |
| 4,346,437 | 8/1982 | Blahut et al. | 364/200 |
| 4,409,654 | 10/1983 | Wada et al. | 364/200 |
| 4,498,136 | 2/1985 | Sproul, III | 364/200 |

*Primary Examiner*—Thomas M. Heckler
*Attorney, Agent, or Firm*—Leslie G. Murray

[57] ABSTRACT

Apparatus is provided which interrupts arithmetic and logical operations defined by a major opcode instruction if the resultant overflows its defined length. One major opcode defines the arithmetic and logical operations between two operands in registers and the result, zero, one, the generated condition or first operand is stored in a register.

1 Claim, 2 Drawing Figures

OPERATION CODE SELECTED OVERFLOW INTERRUPTS

BACKGROUND

The present invention concerns interrupt signals to interrupt execution of an instruction in a computing system when performing calculations on one or more operands.

The term interruption is utilized to discuss the basic mechanism which handles traps, checks, faults and interrupts. Traps include two sorts of possibilities: either the functions or operations requested by a current instruction cannot or should not be carried out, or system intervention is desired by the user before or after the instruction is executed. Examples of the first possibility include arithmetic operations which result in overflow and instructions executed with insufficient privilege for their intended function.

Typically, when an arithmetic operation results in an overflow, the overflow is either ignored or is "trapped" out utilizing a data trap. When the overflow is ignored, meaningless data may result and be used in the execution of the remainder of the instruction. Typically, the processor status word (PSW) contains a bit which directs overflow control. This results in a global instruction for overflow trapping which complicates the operating system design and user application programs. Further, selective trapping of a data overflow is not possible without changing the PSW bit which provides overflow control.

SUMMARY OF THE INVENTION

In accordance with the principles of the present invention, selective data or overflow trapping is provided. Overflow control for a particular arithmetic operation is determined by a seven-bit field within the operation instruction thereby eliminating a global overflow control mode.

DESCRIPTION OF THE PREFERRED EMBODIMENT

Figure 1:
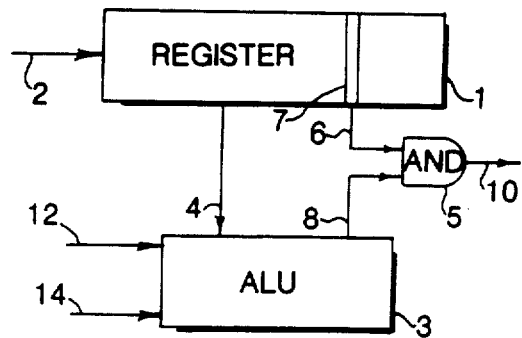
FIG. 1 illustrates a block diagram of the preferred embodiment in accordance with the principles of the present invention.

Referring to FIG. 1, the preferred embodiment of the present invention comprises arithmetic logic unit (ALU) 3, AND gate 5 and instruction storage register 1. The ALU 3 receives a first operand and a second operand on lines 12 and 14, respectively, and, in response to a control signal on line 4, performs a desired operation. The control signal on line 4 is derived from an instruction or opcode word stored in register 1. The desired operation may be, for example, an addition or a shift and add (multiply) operation. If an overflow occurs as a result of the execution of the opcode stored in register 1, the ALU 3 will provide a logic signal on line 8 to AND gate 5. A logic signal on line 6 which determines whether or not to trap if an overflow occurs is input to the AND gate 5. If both of the signals input to the AND gate 5 are a logic 1, a logic 1 is output on line 10. The logic signal on line 6 is derived from the bit or bits of the opcode word stored in cell 7 of the register 1.

Figure 2:
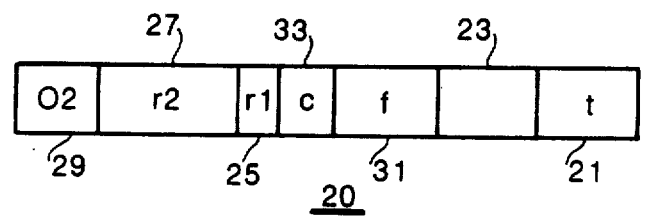
FIG. 2 illustrates a block diagram representing a 32-bit instruction word.

Referring now to FIG. 2, the format of a major opcode instruction word is illustrated. Field 29 is six bits long and is the major opcode field determining the class of operation to be done by the machine. For example, the "02" entered in major opcode field 29 defines a three-register arithmetic and logical instruction; i.e., one major opcode defines arithmetic and logic operations between two operands stored in two general registers (not shown) and (conditionally) puts the result, zero, one, the generated condition or the first operand into a third general register (not shown). Fields 27, 25 and 21 contain the addresses of the general registers holding the operands and the general register where the resultant is stored. Fields 31 and 33 determine the conditions that the resultant is to be tested for and may be any of eight arithmetic conditions or their negations. The opcode extension field 23 is seven bits long and defines the arithmetic or logic operations to be performed; add, subtract or shift, for example. The opcode extension field 23 also contains the bit or bits which determine whether or not to trap if an overflow occurs.

I claim:

1. Apparatus for performing operations on a first operand and a second operand in response to a coded instruction, said apparatus comprising:

calculating means for receiving the first operand and the second operand, said calculating means responsive to a control signal for producing a resultant and for producing an overflow signal indicative of the occurrence of an overflow event;

register means coupled to the calculating means for storing the coded instruction and providing said control signal to the calculating means, said control signal derived from said coded instruction, and for providing a logic signal derived from the coded instruction, said logic signal having a first value if an interrupt function is defined and having a second value if an interrupt function is not defined; and gating means coupled to said register means and to said calculating means for providing an interrupt signal when said logic signal is of said first value and said overflow signal indicates that an overflow event has occurred, the calculating means responsive to the interrupt signal to cause an interrupt of the operation defined by said coded instruction.

* * * * *